United States Patent [19]

Matthews et al.

[11] Patent Number: 4,783,169

[45] Date of Patent: Nov. 8, 1988

[54] CONTROL OF A RING LASER GYRO CAVITY ACCORDING TO A PRESELECTED MODEL

[75] Inventors: Anthony Matthews, Calabasas; Guy T. Varty, Woodland Hills; Jeffrey S. Darling, Chatsworth; Steven C. Gillespie, Canoga Park, all of Calif.

[73] Assignee: Litton Systems, Inc., Beverly Hills, Calif.

[21] Appl. No.: 764,441

[22] Filed: Aug. 9, 1985

[51] Int. Cl.⁴ .......................... G02F 1/09; H01S 3/10
[52] U.S. Cl. ......................................... 356/350; 372/9
[58] Field of Search ............................. 356/350; 372/9

[56] References Cited

U.S. PATENT DOCUMENTS

| | | | |
|---|---|---|---|
| 3,715,562 | 2/1973 | Dendy et al. | 356/350 |
| 4,190,364 | 2/1980 | Ljung et al. | 356/350 |
| 4,243,324 | 1/1981 | Friedland | 356/350 |
| 4,267,478 | 5/1981 | Ljung | 356/350 |
| 4,281,930 | 8/1981 | Hutchings | 356/350 |
| 4,284,964 | 8/1981 | Maier, Jr. | 331/94.5 |
| 4,314,174 | 2/1982 | Wing et al. | 372/18 |
| 4,344,706 | 8/1982 | Ljung et al. | 356/350 |
| 4,529,876 | 7/1985 | Walker | 356/350 |

FOREIGN PATENT DOCUMENTS

| | | |
|---|---|---|
| 1245282 | 10/1967 | United Kingdom . |
| 1237663 | 5/1969 | United Kingdom . |
| 2021851 | 12/1979 | United Kingdom . |
| 2062950 | 5/1981 | United Kingdom . |
| 2109623A | 6/1983 | United Kingdom . |

Primary Examiner—Gene Wan
Attorney, Agent, or Firm—Nilsson, Robbins, Dalgarn, Berliner, Carson & Wurst

[57] ABSTRACT

A ring laser gyro having a cavity with at least one transducer-actuated mirror is controlled to conform to a preselected model of cavity operation. Control is accomplished by sampling cavity data, comparing the data to the model to generate an error signal, and controlling the mirror according to the error signal. In a preferred embodiment, at least two mirrors are dithered and the model defines an optimal amplitude of mirror dither at which theoretical lock-in error is zero. In another preferred embodiment, the sampled data corresponds to laser intensity within the cavity and the model defines an optimal intensity displaced from the maximum within an operating mode of the cavity. The model may define a plurality of operating modes of the cavity, ranked according to gyro performance for different values of a preselected environmental condition. The environmental condition is then sensed on an ongoing basis and used to select an optimal mode.

33 Claims, 5 Drawing Sheets

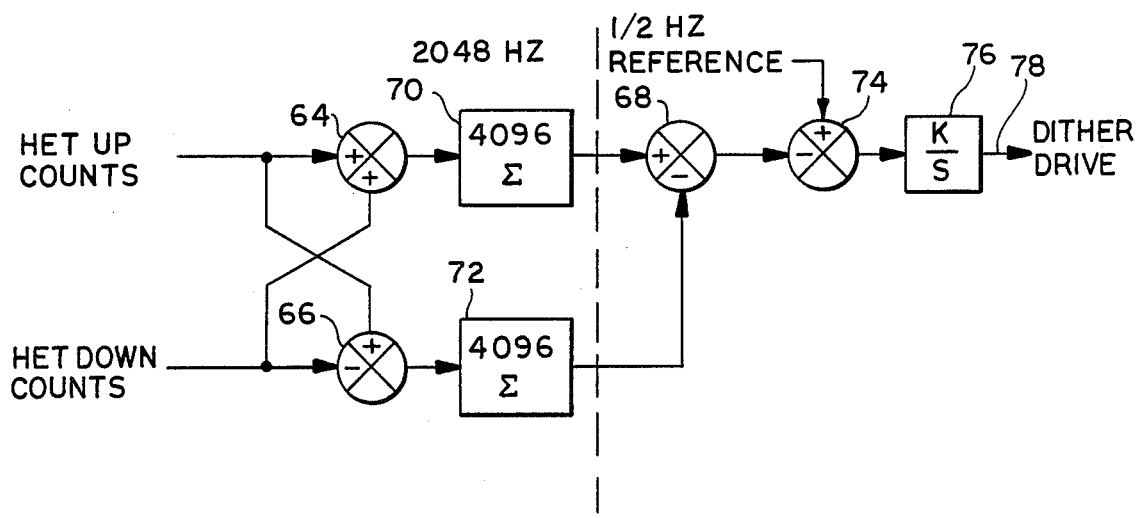
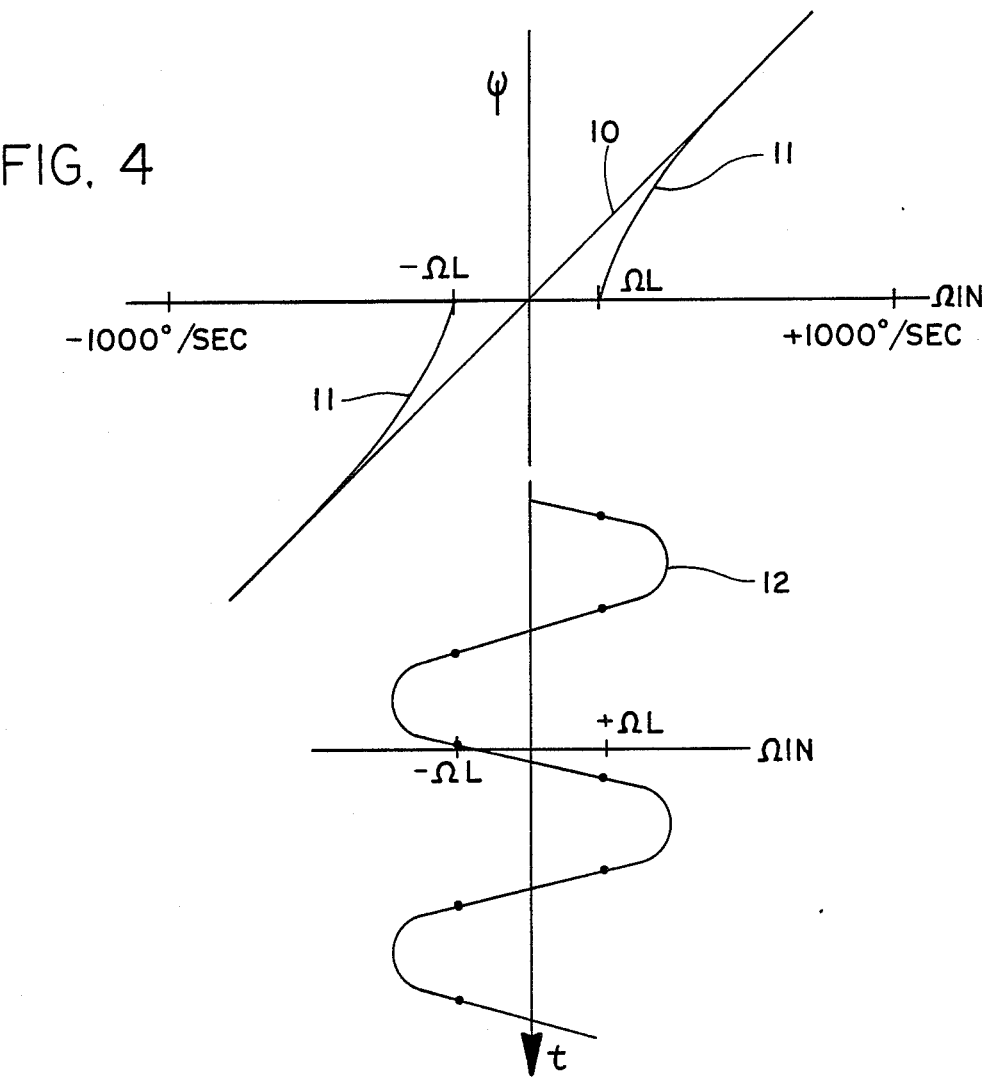

CONTROL OF A RING LASER GYRO CAVITY ACCORDING TO A PRESELECTED MODEL

BACKGROUND OF THE INVENTION

The present invention relates to ring laser gyros and, more particularly, to a method of controlling such gyros according to a preselected cavity model to enhance gyro performance.

In a ring laser gyro, laser beams circulating in opposite directions around the same closed path are shifted in frequency when a cavity containing the path is rotated about a preselected input axis. With no angular motion about the input axis, the beams travel equal distances around the cavity and their optical frequencies are the same. Angular movement in either direction about the axis causes an apparent increase in cavity length for the beam traveling in the direction of movement and a corresponding decrease for the beam traveling in the opposite direction. Because the closed optical path is a resonant cavity providing sustained oscillation, the wavelengths of the beams increase and decrease, respectively. This causes a differential proportional to the angular rate of the input to occur between the beam frequencies. The frequencies heterodyne at a common photodetector, giving rise to a beat frequency directly proportional to the angular rotation rate.

At low angular rates, the frequency differential between the beams is small, causing the beams to resonate together or "lock-in" so that they oscillate at a single frequency. Thus, it is difficult to measure low angular rates because the frequency differential proportional to the angular rate does not exist. This problem is illustrated graphically in the upper portion of FIG. 4, wherein the gyro output signal ($\psi$) is plotted against the angular rate of the gyro ($\Omega_{in}$). In the graph, a diagonal line 10 bisecting the first and third quadrants represents the proportional output of a perfect gyro, while curves 11 represent the output of a real, undithered ring laser gyro having an output equal to zero at inputs between $-\Omega_1$ and $+\Omega_1$. The difference between the ideal and actual outputs is the bias error due to lock-in.

It is common practice to minimize bias error by mechanically oscillating or "dithering" the body of a gyro. Systems of this type are disclosed in U.S. Pat. Nos. 4,190,364, 4,314,174 and 4,344,706. They superimpose a relatively large dithering motion upon the gyro input, averaging the error so that low rates of input are detectable. At present, body dither is accomplished at frequencies on the order of 400 hertz and angular velocities of approximately 120 degrees per second. However, such movements are difficult to control and typically leave a significant level of bias error.

A variety of techniques have been proposed for further reducing the bias error of mechanically dithered gyros, the most common being to superimpose a secondary random dither which reduces error accumulation. However, such secondary dither significantly increases "random walk" and presents a practical lower limit on signals detectable by it.

In operating a ring laser gyro it is important to maintain cavity length constant, at a value corresponding to a preselected laser intensity within one of several "modes" of cavity operation. Selection of a mode is accomplished by applying a voltage to a transducer associated with a mirror of the cavity. Ring laser gyros have heretofore been constrained to operate within a single predetermined mode, chosen on the basis of lowest random walk at a typical operating temperature, and have relied upon high frequency modulation of the control mirror and a simple closed loop feedback system to track the laser intensity to the peak of the mode. The modulation frequency has typically been in the neighborhood of 6 kilohertz. In this context, prior gyros have operated under a rigid set of constraints which were believed necessary for satisfactory operation.

Therefore, it is desirable in many applications to provide an apparatus for controlling a ring laser gyro cavity in a manner which minimizes errors due to lock-in, random walk and other sources.

SUMMARY OF THE INVENTION

The present invention relates to a method and apparatus for controlling a ring laser gyro having a cavity with at least one control transducer associated with a mirror or other reflective surface thereof, and having at least one parameter characteristic of cavity operation, in which a preselected model of cavity operation is maintained; cavity data is sampled as a measure of said parameter; the sampled data is compared to the model; and the transducer is controlled so that the parameter conforms to the model. In a preferred embodiment, the model is maintained by storing digital information representative of it, and the sampled data is digitized and compared to the model using digital techniques. In another preferred embodiment, two mirrors are dithered and data as to the dither amplitude is sampled. The model then defines optimal dither amplitudes at which theoretical lock-in error is zero, and the transducers are controlled accordingly. In an alternative embodiment, the sampled data corresponds to the intensity of the laser beam within the cavity and the model represents a cavity operated at a preselected variable intensity displaced from the peak intensity within the mode. The model may also define a plurality of operating modes of the cavity and contain information as to the relative performance of the gyro in each mode as a function of at least one environmental condition, such as temperature. The mode giving rise to optimal performance at the sensed condition value is then-selected and acquired through the control transducer.

The cavity control system of the present invention significantly reduces bias error and random walk by precisely controlling a laser cavity according to a preselected model of cavity operation. In a first significant embodiment, cavity length control mirrors are dithered at an optimal magnitude corresponding to a zero point of the error portion of the gyro output signal near zero rate.

The gyro output signal ($\psi$) can be expressed as:

$$\psi = 2\pi\Omega_{IN}T + M\mathrm{SIN}\omega_D T + 2\pi \times \Omega_L J_0(M) \frac{\mathrm{COS}2\pi\Omega_{IN}T}{2\pi\Omega_{IN}} +$$

$$2\pi \times \Omega_L J_1(M) \left( \frac{\mathrm{COS}(2\pi\Omega_{IN} + \omega_D)T}{2\pi\Omega_{IN} + \omega_D} \right) + \ldots$$

the first two terms being a "true signal" consisting of angular input from vessel motion ($2\pi\Omega_{in}T$) and the dither signal ($M\cdot\mathrm{SIN}\omega_D T$); where M, the modulation index of dither motion, equals $2\pi\beta_M/\omega_D$. The remaining terms of the expression represent the bias error of the gyro, expanded as a Bessel series which periodically goes to zero. In the method of the present invention, dither amplitude is carefully controlled so that the system operates at one of the zero points of the first Bessel term, essentially eliminating the error terms near zero rate. Such control is difficult in a mechanically dithered gyro but is attainable in the context of the present invention by accurately dithering the cavity mirrors at the desired amplitude. Random walk is also kept to a minimum because secondary dither is not required.

The gyro can be subjected to mirror dither alone, yielding the greatest reduction in bias error, or to a combination of mirror dither and body dither. In the latter case, the body dither component is lower in amplitude than that required without mirror dither and therefore is more easily controllable.

The present system of controlling a gyro cavity according to a sophisticated mathematical model permits lock-in error to be reduced even further by dynamically selecting a mode of cavity operation for which random walk is lowest under the environmental conditions encountered, and by operating the gyro off the peak of a mode at a point giving rise to reduced random walk. Each of these methods, taken independently, is capable of increasing gyro performance by at least 10 to 20 percent. Furthermore, the increases in performance are additive between methods, making it possible to combine them to produce gyros vastly superior to those of the prior art.

BRIEF DESCRIPTION OF THE DRAWINGS

The above and other features of the present invention may be more fully understood from the following detailed description, together with the accompanying drawings, wherein similar reference characters refer to similar elements throughout and in which:

FIG. 3 is a flow diagram of a mirror dither control system constructed in accordance with another preferred embodiment of the present invention;

FIG. 4 is a graphical representation of the output characteristics of a simple, unbiased ring laser gyro, with a mirror dither input typical of the present invention shown below it for purposes of comparison;

DESCRIPTION OF THE PREFERRED EMBODIMENTS

Figure 1:
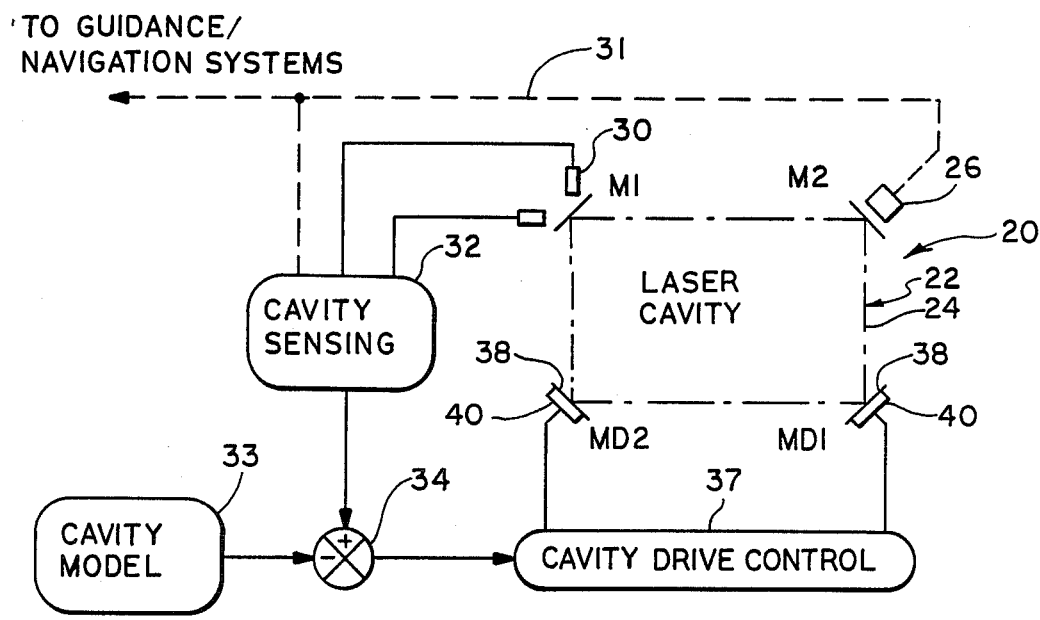
FIG. 1 is a functional block diagram of a cavity control system constructed according to a preferred embodiment of the present invention.

FIG. 1 illustrates a system 20 for controlling a cavity 22 of a ring laser gyro having a closed optical path 24 defined by mirrors M1, M2, MD1 and MD2. Laser beams are reflected in opposite directions around the path 12 to sense rotation about an input axis perpendicular to the path. An interference pattern corresponding to the beat frequency of the combined laser beams is detected by a photodiode 26 disposed behind the mirror M2, and the maximum intensities of the counter-propagating laser beams are detected by similar photodiodes 28 and 30 positioned behind the mirror M1. The output of the photodiode 26 follows a path 31 for use in connection with a cavity sensing means (32) and a primary guidance/navigation system (not shown) of which the system 20 is a part. The outputs of the photodiodes 28 and 30 are used exclusively for cavity sensing and, along with the output of the photodiode 26, are evaluated for comparison with a preselected cavity model 33.

The cavity model may be a sophisticated model of cavity operation, such as a model in which a pair of mirrors are dithered at a carefully controlled amplitude to minimize lock-in error and random walk. Alternatively, it may be a scheme of cavity operation which is dynamically dependent on one or more environmental conditions, such as the temperature to which the gyro is subjected. In either case, the comparison function, indicated schematically as a summing point 34, produces a cavity error signal for use by a cavity drive control means 37 to drive the mirrors MD1 and MD2. Contingent modes of operation can also be incorporated into the cavity model 33 or the cavity drive control means 37 to keep the system operating after a failure of one or more of its components.

The laser cavity 22 may take any of a variety of forms having three or more mirrors for defining the optical path 24. In the embodiment illustrated, the mirrors M1 and M2 are partially transmissive mirrors which permit light to reach the photodiodes 26, 28 and 30, while the mirrors MD1 and MD2 are conventional cavity control mirrors having reflective surface portions 38 and piezolectric transducers 40 for driving the reflective surface portions.

The system 20 may take any of a variety of forms, including a special purpose analog or digital control circuit, but is most easily implemented by a microprocessor, a sequencer or a similar controller in which the cavity model is stored in memory. The microprocessor implementation is illustrated generally in FIG. 2, wherein the control apparatus is outlined by broken lines 42. The outputs of the photodiodes 28 and 30 are applied to individual amplifiers 44 and are compared by an AC comparator 46 and a DC comparator 48 to derive the maximum intensity of the laser beams. The resultant intensity signals and an ambient temperature signal 50 are passed through a multiplexer 51 and an analog-to-digital converter 52 to a microprocessor 54 which evaluates the intensity data and compares it to the cavity model. Sampling of intensity and temperature information is controlled by the microprocessor 54 which transmits a sampling signal to the multiplexer 51 along a line 56. The digital outputs of the processor are converted to analog mirror drive signals by digital-to-analog converters 53 for application through amplifiers 55 to the mirrors MD1 and MD2.

The output of the photodiode 26 is a heterodyned ("het") signal corresponding to passing lines of an interference fringe produced by the counter-propagating laser beams. It is an analog signal representing the angle through which the gyro has been rotated, and is applied to a counter 58 which digitizes and counts it. The output of the counter 58, which is the output signal of the gyro, passes to guidance/navigation systems (not shown) along a line 60 and to the microprocessor 54 along a line 62. Thus, the microprocessor 54 receives "up" and "down" counts of the het signal as well as laser intensity and ambient temperature information, all for use in feedback control of the cavity according to the preselected model.

Operation of the system 20 to control the cavity according to a preselected model is best illustrated by reference to certain preferred functions of the system. FIG. 3 is a functional block diagram of a preferred embodiment in which equal and opposite dither signals are applied to the mirrors MD1 and MD2 at a magnitude corresponding to a zero point of the first order Bessel term of the bias error expression. A high frequency (AC) component of the het signal is extracted by taking the sum and difference of the het "up" counts and the het "down" counts, which correspond to opposite rotations about the input axis of the gyro, and subtracting the difference of the counts from the sum of the counts. The sum of the up and down counts is taken at a point 64, the difference between the up and down counts is taken at a point 66, and the difference is subtracted from the sum at a point 68. The "sum" and "difference" signals are summed over a 4,096 bit cycle, as indicated by summation blocks 70 and 72, respectively, reducing the iteration rate from a sample rate of 2,048 hertz to a comparison rate of one-half hertz.

The output of the subtraction at the point 68 is proportional to the total reciprocal motion applied to the system by dithering the mirrors. The component of the het signal caused by movement of the gyro about its input axis is essentially a DC signal which is removed by subtracting the difference of the up and down counts from their sum. The resulting signal is compared at 74 with a reference signal computed from theory to satisfy the "Bessel zero condition" at which the bias error of the gyro is a minimum. The output of the point 74 is integrated over time at the block 76, producing an output signal 78 which represents the amount by which the dither drive signal must be corrected. Thus, the signal 78 is added to the mirror dither signal to achieve Bessel zero operation.

Figure 5:
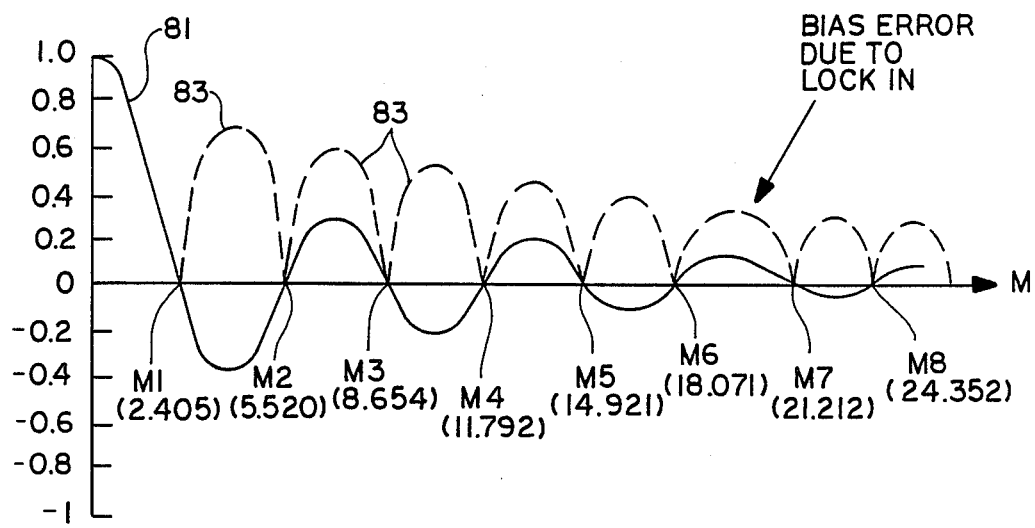
FIG. 5 is a graphical representation of the zero order term of the lock-in error equation for a ring laser gyro, expanded as a Bessel series, with the resultant error shown in broken lines.

The concept of dither control according to the method of the present invention is best understood in conjunction with FIGS. 4 and 5, wherein FIG. 4 is a plot of the gyro output equation set out above. As described briefly above, the first two terms of the output equation represent (i) movement of the airplane or other vessel about the input axis of the gyro and (ii) dither input to the gyro, respectively. The remaining terms represent the bias error due to lock-in, expanded as a Bessel series. A simple, unbiased gyro would ideally have an output given by the first term of the output equation, in which the output ($\psi$) would be proportional to rotation about the input axis ($\Omega_{IN}$). Such an output is represented by the straight line 80 of FIG. 4. However, the phenomenon of lock-in distorts the output for rotations in the neighborhood of $\Omega_L$ and eliminates output signals for inputs less than that value, introducing the bias error defined by the Bessel terms of the output equation. Thus, the output of a real, undithered gyro is more in the nature of the curves 11 of FIG. 4.

In prior ring laser gyros, bias error has been reduced by moving the gyro body rapidly through large angles so that the time during which the absolute value of the combined input is less than $\Omega_L$ is small. A typical angular velocity of such body dither is approximately 100 degrees per second, which is difficult to control and can lead to substantial errors of its own. For this reason, gyros relying on body dither often incorporate a "secondary" random component of body dither to minimize error accumulation. However, such random motion introduces noise known as "random walk", requiring that the gyro be made more precise in other ways to achieve a desired level of performance.

The effect of dither amplitude on bias error is shown graphically in FIG. 5, which is a plot of the zero order term of the Bessel expansion of bias error due to lock-in. The zero order term, which is a good approximation of the entire series near zero rate, is a function 81 which generally decreases with increasing dither amplitude and periodically goes to zero at modulation points or "indices" M1, M2, M3, etc. This results in a total bias error which is always positive but goes to zero at the modulation points, as represented by the broken line curve 83 of FIG. 5.

In the embodiment of FIG. 3, the control system of the present invention drastically reduces bias error by applying a dither signal to the cavity control mirrors (MD1 and MD2) at a magnitude which is carefully controlled so that the gyro operates at one of the "Bessel zero" indices (M1, M2, etc.). The amplitude of mirror dither can be much less than that of conventional body dither because the components of the output signal resulting from bias error cancel each other at the Bessel zero points. This is shown graphically in FIG. 4, wherein a mirror dither signal 12 is shown parallel to and offset beneath the true input signal ($\Omega_{IN}$) of the gyro. The effective angular rate of the dither motion exceeds the minimum input below which lock-in occurs ($\Omega_L$), but need not reach a point at which the output signal ($\psi$) approaches the diagonal line of an ideal gyro. Thus, the problems associated with large dither amplitudes are largely absent in the case of mirror dither according to the present invention. The cancellation of errors also reduces bias error far below that achieved with body dither, obviating the need for a random secondary dither component. Consequently, random walk is greatly reduced.

In accordance with the present invention, a plurality of mirrors are dithered out-of-phase with one another so that cavity length is unaffected by the dithering motion. For example, two mirrors can be dithered at equal amplitudes 180 degrees out-of-phase. Mirror dither movement at a frequency of 2,000 hertz and a magnitude corresponding to a Bessel zero point between approximately 1/10th degree and 10 degrees per second is then sufficient to overcome bias error due to lock-in in a typical ring laser gyro. Alternatively, it is sometimes desirable to apply body dither at a greatly reduced amplitude while simultaneously dithering mirrors in a carefully controlled fashion. This is preferred when the mirrors MD1 and MD2 cannot be moved through the distances required to control the cavity by mirror dither alone.

Figure 2:
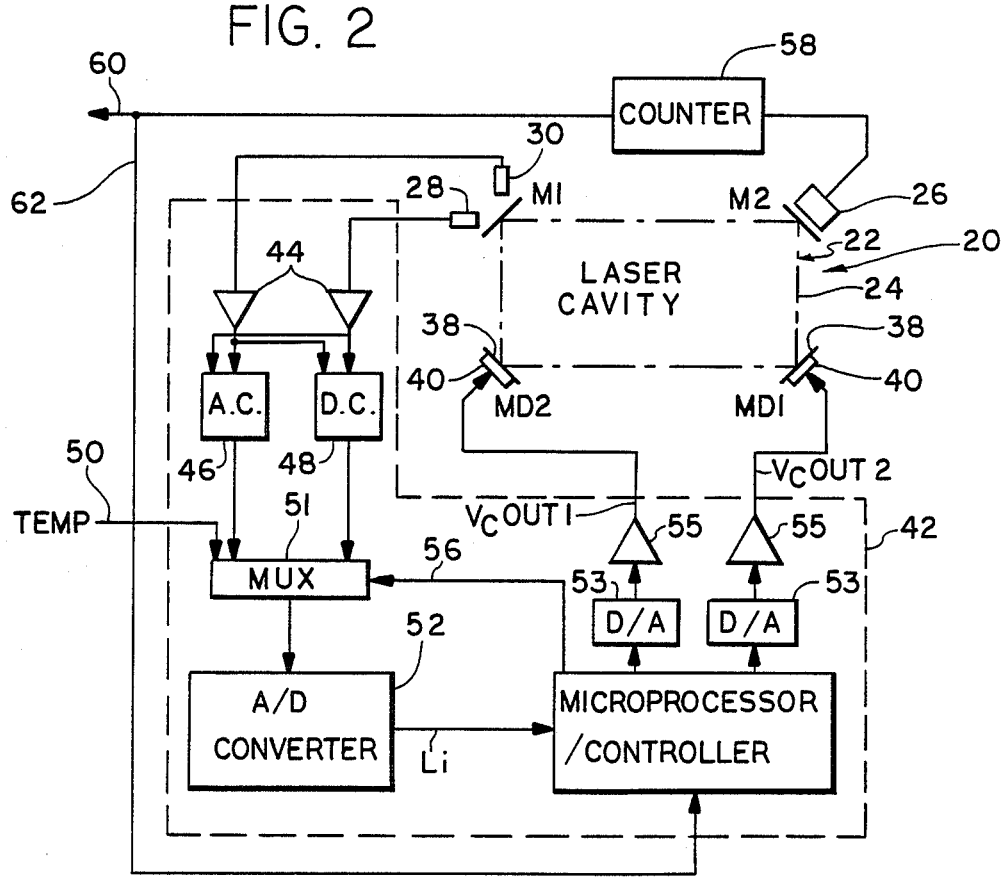
FIG. 2 is a generalized hardware block diagram of the system of FIG. 1.

In each of the circumstances described above, a specific model of cavity operation is generated and embodied either as a hardware circuit implementing the function of FIG. 1 or as digital information stored within the microprocessor 54 (FIG. 2).

The mirror dither described above is to be distinguished from "modulation" signals applied to ring laser cavity mirrors for the purpose of tracking laser intensity to the peak of a mode within which the cavity operates. Such modulation takes the form of a voltage of approximately 0.5 volts applied to the mirrors at a frequency of approximately 6 kilohertz to increase and decrease cavity length. If more than one mirror is used, the control signals are typically in phase so that cavity length is modulated. By contrast, the mirror dither disclosed herein requires voltages out-of-phase with each other and an order of magnitude greater than that used for mirror modulation.

Another model for mirror dither according to the method of the present invention is a dynamic model in which mirror dither is varied over a range of amplitudes as bias error is measured. The resulting data is substituted into the error expression of the lock-in error equation to calculate $\Omega_L$ for each Bessel zero index. $\Omega_L$ is a convenient measure of mirror quality, and thus the quality of the gyro itself. Data as to $\Omega_L$ Bessel zero point enables the indices to be ranked according to bias error.

Figure 8:
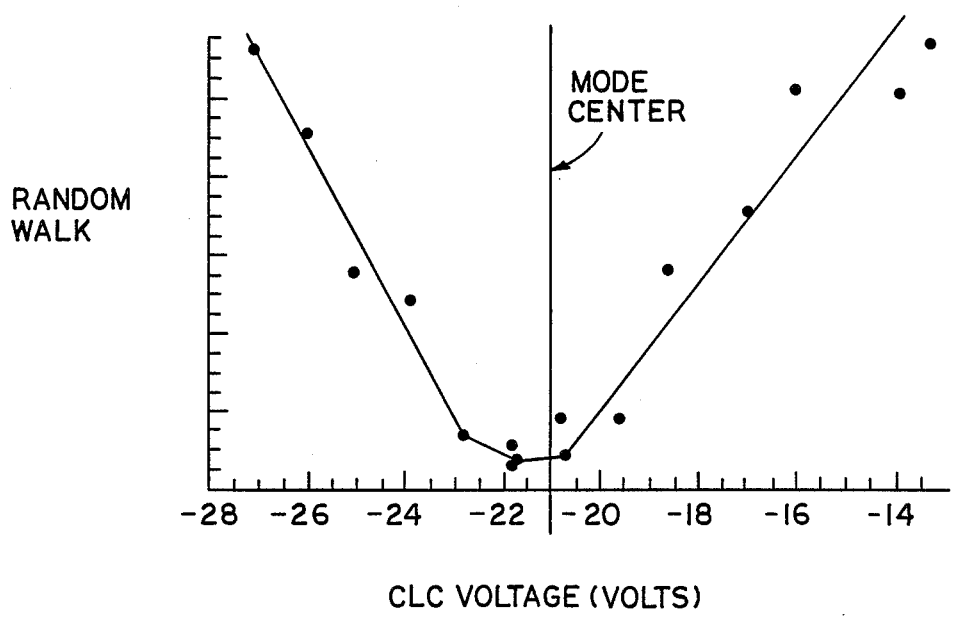
FIG. 8 is a graphical representation of random walk data obtained by the methods of the present invention over one of the modes of a ring laser gyro cavity.

Other cavity models useful to control a gyro cavity in the context of the present invention include models in which cavity length is controlled to operate at a point displaced from the peak of an operating mode or to select a preferred operating mode on a dynamic basis according to temperature or other environmental conditions to which the cavity is subjected. With regard to the first such model, applicants have determined that a cavity operated to one side of the peak of laser intensity within a mode gives rise to lower random walk than the same cavity operated at the peak. This is true for ring laser gyros, generally. That is, there is a measurable point displaced from the peak of each mode for which the gyro exhibits a lower random walk than it does at the peak (FIG. 8). Although not bound by any theory, the point of lowest random walk is believed to be a function of the gas mixture within the gyro. It may be approximately 3 percent of the applied voltage when the gas is a blend of helium and neon.

Figure 7A:
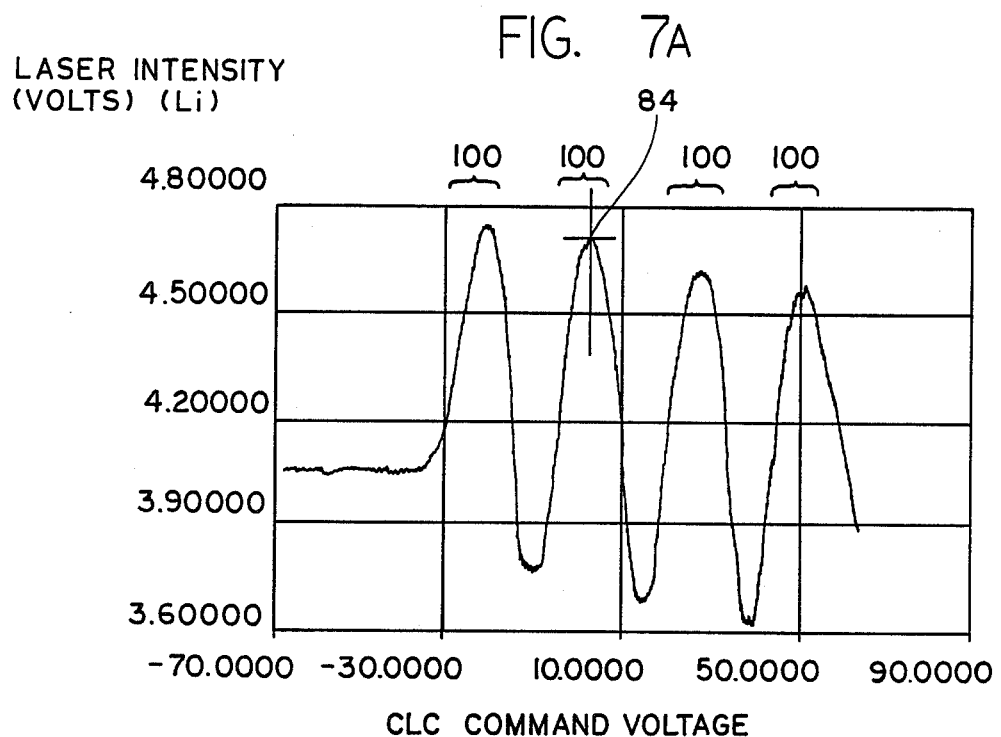
FIG. 7A is a graphical representation of experimental intensity data within a ring laser gyro cavity.
Figure 7B:
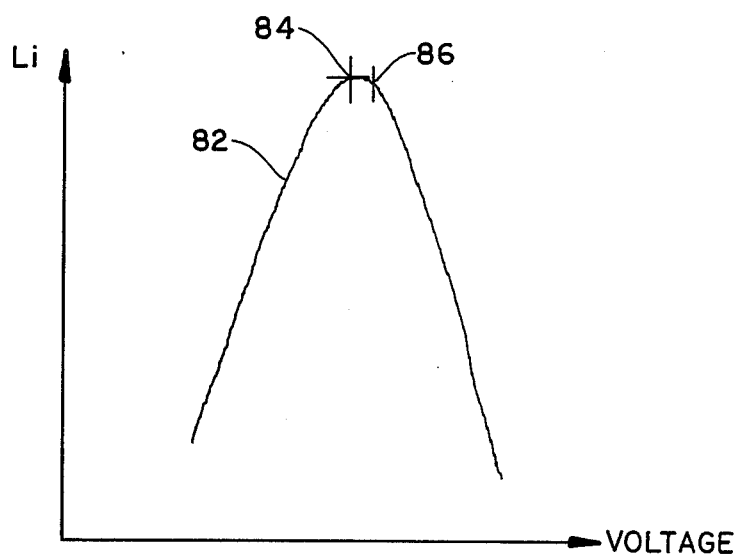
FIG. 7B is an enlargement of a portion of the graph of FIG. 7A near the peak of a mode of the gyro.

The off-peak operating point of the present invention is illustrated in FIGS. 7A and 7B, wherein the curve 82 represents the intensity profile of a mode in the region of its peak 84. The operating point used in the practice of the invention is a location 86 displaced from the peak 84.

Figure 6:
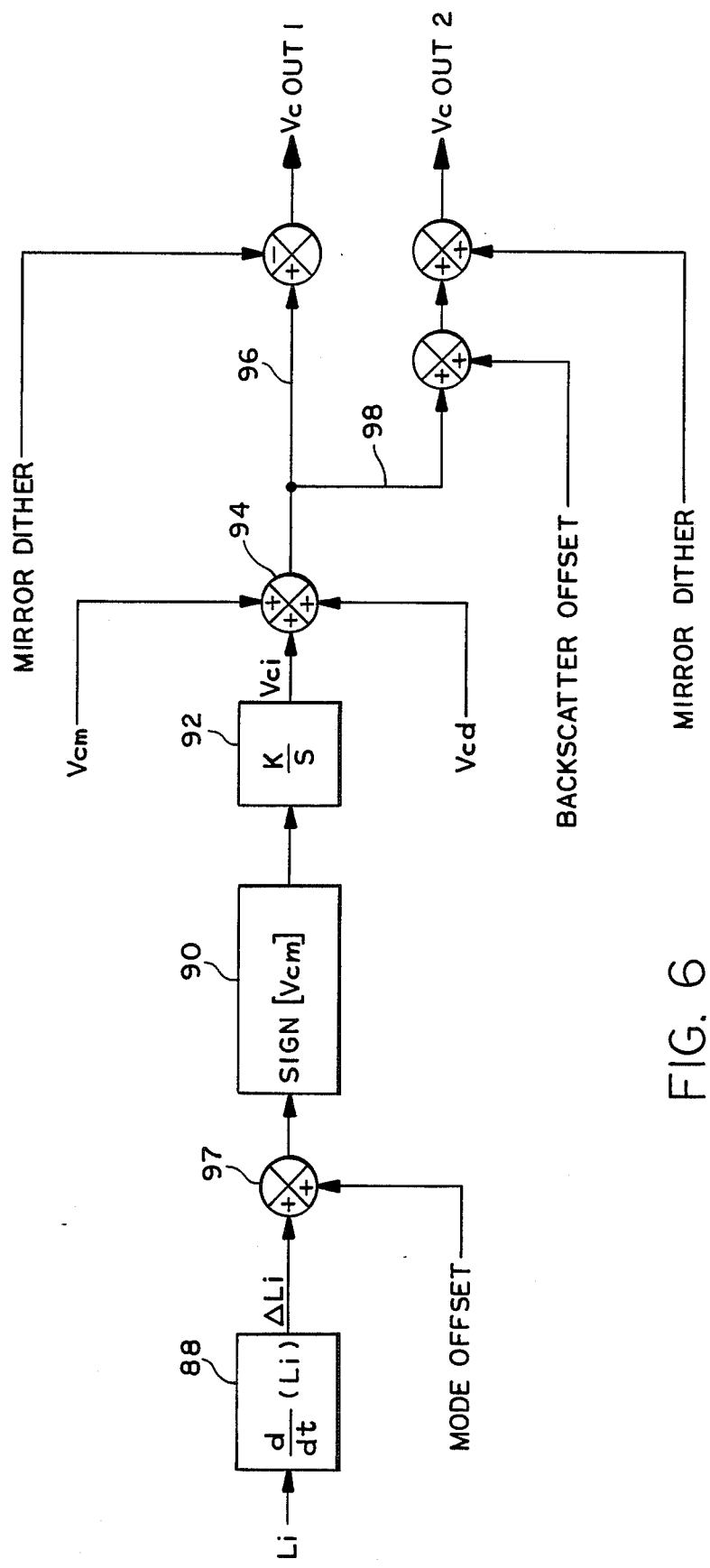
FIG. 6 is a flow diagram of a cavity length control system constructed according to a further embodiment of the present invention.

FIG. 6 is a functional block diagram of an algorithm used to control cavity length according to the foregoing models. The algorithm is essentially as follows:

$$\Delta Li = Li - Li_{old} \quad (1)$$

$$Li_{old} = Li \quad (2)$$

$$\Delta Li = \Delta Li + \text{mode offset} \quad (b\ 3)$$

$$\Delta Li = \Delta Li \cdot \text{SIGN}[Vcm] \quad (4)$$

$$V_{ci} = V_{ci} + \Delta Li \cdot K \quad (5)$$

$$V_{cout} = V_{ci} + V_{cd} + V_{cm} \quad (6)$$

$$V_{cout1} = V_{cout} - \text{Mirror Dither} \quad (7)$$

$$V_{cout2} = V_{cout} + \text{Mirror Dither} + \text{Backscatter Offset} \quad (b\ 8)$$

The input to the algorithm is the laser intensity signal (Li) which has been sampled and digitized by the amplifiers 44, the comparators 46 and 48, the multiplexer 51 and the analog-to-digital converter 52, all of FIG. 2. The resulting digital signal is the feedback by which the system 20 controls cavity length to generate a pair of output voltages ($V_{cout1}$, $V_{cout2}$) to the transducer-controlled mirrors, MD1 and MD2, respectively. The first step of the method, accomplished at block 88 of FIG. 6 (line 1 of the above listing), is to differentiate the laser intensity signal by subtracting a previously sampled laser intensity from the current laser intensity. The result of this step ($\Delta Li$) is an error signal corresponding to movement away from the previous intensity value. The value of the current laser intensity is then stored (line 2) at the memory address of the previous intensity to prepare the system for the next differentiation step.

The incremental error signals ($\Delta Li$) are demodulated at block 90 (line 4) and integrated at block 92 (line 5) to yield a signal representative of the voltage ($V_{ci}$) to be applied to the mirrors to reach a desired mean operating point within the mode. The block 90 is essentially a digital demodulator which keeps track of the sign of the error signal ($\Delta Li$) according to the sign of an applied modulation voltage ($V_{cm}$). For present purposes, the modulation voltage is assumed to be a 2,000 hertz square wave signal modulating cavity length in the manner known to the art. The error signals are numerically integrated at the block 92 to yield the total error of the system over the time period involved. The time constant of the integration, determined by the value "K" of the block 92, can be as short as a few milliseconds or as long as a few seconds in the present context. The modulation signal ($V_{cm}$) is added to the cavity correction signal ($V_{ci}$) at 94 to yield a mirror drive signal along a pair of lines 96 and 98.

The cavity models discussed herein are implemented in the method of FIG. 6 by adding appropriate signals to either the error signal ($\Delta Li$) or the control voltage ($V_{ci}$). The operating point is displaced from the peak of the mode by adding a "mode offset" signal at 97 to the error signal ($\Delta Li$), and the mode in which the system operates is selected by applying a displacement control voltage ($V_{cd}$) to the correction voltage ($V_{ci}$) at the point 94. These inputs control the mean operating point of the laser cavity.

The voltage output from the summing point 94 is a digital signal capable of maintaining cavity length according to a preselected static or dynamic model. Because it is digital in character, other signals can be added to it without disrupting cavity length control. Thus, a "mirror dither" control voltage generated by the method of FIG. 3 is applied in opposite polarities to the output lines 96 and 98 to superimpose the mirror dither function onto the mirrors. In addition, a "backscatter offset" signal can be applied to one of the lines to offset the laser beam relative to the mirrors so that the beam is not scattered by known imperfections in the mirrors.

The outputs along the lines 96 and 98, after any mirror dither and backscatter offset signals are applied, constitute the output control voltages ($V_{cout1}$ and $V_{cout2}$) to the mirrors. These voltages have large DC components corresponding to the displacement control voltage ($V_{cd}$) and the "mode offset" voltage, and AC components corresponding to the modulation signal ($V_{cm}$) and the "mirror dither" signal. When the mirrors MD1 and MD2 are conventional piezoelectric-controlled ring laser gyro mirrors, the displacement control voltage ($V_{cd}$) is typically between $-65$ volts and $+65$ volts, and the "mode offset" voltage is approximately 3 percent of the applied voltage. For example, when the displacement control voltage is 30 volts, the mode offset may be approximately 1 volt. The mirror modulation voltage ($V_{cm}$) and the "mirror dither" voltages are widely variable in frequency but may be approximately 2,000 hertz. In that case, the modulation voltage may be as high as approximately 1 volt and the mirror dither voltage may be as high as approximately 30 to 40 volts. More typical values for the modulation and dither voltage amplitudes are approximately 0.5 volts for modulation and approximately 10 to 20 volts for mirror dither.

The operation of the cavity length control system of FIG. 6 can be understood most easily in the context of FIGS. 7A and 7B, which represent a series of intensity peaks or modes 100 within a ring laser gyro cavity, such as the cavity 22 of the present invention. FIG. 7A shows the peaks 100 obtainable by sweeping the cavity through a wide range of cavity lengths. Random walk of the gyro can then be measured for each mode and the modes can be ranked according to random walk characteristics. Measurements are preferably made over ranges of temperature or other environmental conditions, enabling the system to select an operating mode of least random walk and/or greatest operating range in response to conditions encountered in operation. Thus, the cavity model 33 (FIG. 1) may contain information as to the optimal mode for each of a number of different temperatures, along with the displacement control voltages ($V_{cd}$) required to drive the cavity to each mode.

A mode is initially chosen during the "mode acquisition" phase of system operation, when the intensity feedback loop of blocks 88–92 (FIG. 6) and the modulation voltage ($V_{cm}$) are turned off. The choice is made on the basis of the mode having the lowest random walk and/or the highest dynamic tracking range at a sensed temperature. After acquisition, the feedback loop operates to maintain the intensity at a value offset from the peak of the mode, according to the "mode offset" input of the cavity model. When the temperature or other physical condition changes, that information is monitored by the processor 54 and is used to select a new displacement control voltage and an offset voltage, as required. This assures that the system always operates within the mode of optimal performance under the sensed environmental conditions.

The use of a microprocessor in the system of the present invention permits the model by which the cavity is controlled to be made even more sophisticated, if desired. Thus, the system may continuously test itself and act to overcome abnormalities in cavity operation as soon as they are detected. The abnormalities monitored and the manner in which they are overcome are then part of the model. For example, continued operation of the drive mirrors MD1 and MD2 can be monitored by the processor. If one mirror fails, the cavity length control signal to the other mirror can be doubled to keep the system in operation. This enables the system to continue functioning, although in a somewhat narrower performance range, so that the aircraft or other vessel with which it is associated can remain in operation.

Although the foregoing description is believed adequate to enable a worker skilled in the art to practice the invention, a program listing incorporating the methods of the invention is attached hereto as an Appendix. The program, implemented in the context of the system described herein, has been used to demonstrate the utility of the present methods, as described in detail below.

The performance of a ring laser gyro controlled by the mirror dither method of the present invention was investigated at room temperature using a stationary 52 centimeter ring laser gyro manufactured by Litton Systems, Inc. and identified as model S77. The cavity was controlled by a Zilog Z8000 processor using the cavity length control program of the Appendix, with "mode offset" set to zero. The gyro was initially subjected to sinusoidal body dither of approximately 20 degrees per second at a frequency of approximately 75 hertz. The resulting gyro output, including both the earth's rate of rotation and the bias error, was 8.4600 degrees per hour. The random walk of the gyro under these conditions was measured to be 0.0003 degrees per (hour)$^{\frac{1}{2}}$, representing the best random walk achievable with the gyro by conventional methods. Next, a random secondary component of body dither was applied at an average amplitude of approximately 180 arcseconds and a frequency of 32 hertz in accordance with conventional body dither techniques. In doing so, the gyro output was reduced to 8.4150 degrees per hour, which is substantially equal to earth rate, but random walk increased to 0.0005 degrees per (hour)$^{\frac{1}{2}}$. Finally, mirror dither was substituted for both primary and secondary body dither, using the mirror dither program of the Appendix. A 2000 hertz mirror dither signal was superimposed on the modulation and displacement signals to a pair of cavity control mirrors to dither the mirrors 180 degrees out-of-phase at an amplitude chosen to operate the gyro at one of the Bessel zero indices discussed above. The overall rate of dither motion was approximately 5.5 degrees per second, resulting in an output of 8.4153 degrees per hour and a random walk of 0.0003 degrees per (hour)$^{\frac{1}{2}}$. Thus, the mirror dither method of the invention has been shown to virtually eliminate bias error due to lock-in while reducing random walk by 40 percent from the value encountered with body dither having a random secondary component.

The effect of operating a ring laser gyro cavity at a point displaced from the peak of an operating mode has also been investigated. In this case, tests were performed at 97 degrees Fahrenheit using a stationary 28 centimeter ring laser gyro manufactured by Litton Systems, Inc., and identified as Serial No. 1088. The cavity was controlled by the same processor using the cavity length control program of the Appendix. In the program, the digital feedback signal is compared first to a model having a stationary operating point displaced from the peak of a mode and then to a model which "sweeps" the gyro through a number of modes. Measurements of random walk during operation off the peak of the mode showed improvement of better than ten (10) percent in random walk. Typical results are illustrated in FIG. 8, wherein a point 110 of lowest random walk is displaced from the mode center 112 by a distance corresponding to one (1) additional volt applied to the cavity length control mirrors. Specifically, random walk, at the point 110 was measured to be 0.00028 degrees per (hour)$^{\frac{1}{2}}$, as opposed to 0.00031 degrees per (hour)$^{\frac{1}{2}}$ *at mode center.*

From the above, it can be seen that there has been provided a method and apparatus for accurately controlling a ring laser gyro cavity according to a preselected static or dynamic model to significantly reduce output errors, including bias error, random walk and other forms of signal noise. Depending upon the form of the cavity model, the system can implement one or more of the novel methods of mirror dither, off-mode control and mode selection, for which the reductions in random walk are cumulative.

The appended claims are not limited to the embodiments described herein, but rather are intended to cover all variations and adaptations falling within the true scope and spirit of the present invention. As an example, the laser cavity 22 may take the form of any known laser cavity useful for gyroscopic purposes, and the cavity sensing, cavity model and cavity drive control functions can be implemented by any of a variety of alternative techniques, including analog or digital hardware circuits.

Mirror Dither

```
bit      bdiseb,#1           // mirror dither enabled ?
if nz then
   dec    mdcnt,#1            // y. mirror dither due ?
   if z then
      set    mdcnt,#0          // y. new due time
      ld     r2,vcout          // set vcout
      ld     r3,#256           // DAC full scale + 1 bit
      sub    r3,r2             // - vcout = vclcm
      cp     r3,#255           // vclcm ) full scale ?
      if st then
         ld     r3,#255        // y. vclcm = full scale
      fi
      ld     r4,vmdm           // vmdm (mirror dither modulation)
      neg    r4                // vmdm = -vmdm
      ld     vmdm,r4           // save new vmdm add    r2,r4             // vclcp = vcout + vmdm
      if mi then
         sub    r2,r2           // y. vclcp = 0
      fi
      cp     r2,#255           // vclcp ) full scale ?
      if st then
         ld     r2,#255        // y. vclcp = full scale
      fi
$pase
      add    r3,r4             // vclcm = vclcm + vmdm
      if mi then
         sub    r3,r3           // y. vclcm = 0
      fi
      cp     r3,#255           // vclcm ) full scale ?
      if st then
         ld     r3,#255        // y. vclcm = full scale
      fi
      ldb    VCLCP,r12         // VCLCP = vclcp
      ldb    VCLCM,r13         // VCLCM = vclcm
   fi
fi
```

APPENDIX

```
P:ZASM  1.6                  PAGE
LOC   OBJ CODE       STM! SOURCE STATEMENT

1 DITHER MODULE
                      2
                      3 CONSTANT
                      4     SUPPRESS := 1          // do not list database
                      5 //
                      6 //   $title "GEL II, 52 cm Version, Dither Control, 05/02/84"
                      7 //
                      8 //
                      9 //   Global Definitions Database          04/26/84
                     10 //
                     11 //
```

```
page                       12        $IF SUPPRESS $THEN
                           13        $LISTOFF
                          253        $LISTON
                          254
                          255        EXTERNAL
                          256            MDITHAC PROCEDURE
                          257
                          258        $REL  X0000

260        GLOBAL  FREQSEL
0000                      261        A PR.  PROCEDURE
                          262            EN..
                          263 //        ENTRY
                          264 //
                          265 //    Compute Dither Output Frequencies
                          266 //
                          267 //
0000 610A  9090           268        ld     r10,rf              // rf
                          269
0004 54E2  906E           270 fs010: ldl   rr2,isc(r11)         // set isc and iss          B-6
0008 A125                 271        ld     r5,r2               // isc                      B-6
000A DFBE                 272        calr   ABSVAL              // abs[isc]                 B-6/-22
000C 9446                 273        ldl    rr6,rr4             // save it
000E 9646                 274        addl   rr6,rr4             // 2*abs[isc]               B-6/-22
0010 9646                 275        addl   rr6,rr4             // 3*abs[isc]               B-6/-22
0012 9666                 276        addl   rr6,rr6             // 6*abs[isc]               B-6/-22
0014 A135                 277        ld     r5,r3               // iss                      B-6
0016 DFC4                 278        calr   ABSVAL              // abs[iss]                 B-6/-22
0018 9046                 279        cpl    rr6,rr4             // 6*abs[isc](abs[iss] ?
001A E90A                 280        jr     ge,fs012            // n.
001C 4D05 9090 0001       281        ld     kf,#1               // y. kf = 1
0022 2104 0100            282        ld     r4,#4 shl 6         // df = 4 Hz                B6
0026 8355                 283        sub    r5,r5               // df                       B22-6
0028 8D34                 284        test   r3                  // iss ( 0 ?
002A ED0F                 285        jr     pl,fs014            // n.
002C 8D42                 286        neg    r4                  // y. df = -4 Hz            B22/6
002E E80D                 287        jr     fs014
                          288
0030 A134                 289 fs012: ld     r4,r3               // iss                      B-6
0032 8355                 290        sub    r5,r5               // iss                      B13-6
0034 B34D FFF9            291        srai   rr4,#7              // iss                      B3/-13
0038 9B24                 292        div    rr4,r2              // iss/isc                  B9
003A 59C4  908E           293        mult   rr4,sf              // sf*iss/isc = A           B22-6
003E 5406  908A           294        ldl    rr6,df              // df                       B22/6
0042 9264                 295        subl   rr4,rr6             // A - df                   B22/6
0044 B34F 0A00            296        sdai   rr4,r10             // [A - df] * kf            B22/6
0048 9664                 297        addl   rr4,rr6             // new df                   B22/6
                          298
004A 5D04  908A           299 fs014: ldl   df,rr4               // save new df              B22/6
                          301 //
                          302 //
                          303 //
004E 6102  9086           304        ld     r2,wr               // wr                       B6
0052 8342                 305        sub    r2,r4               // wd = wr - df             B6
0054 6F02  9088           306        ld     wd,r2               // save wd                  B6
0058 0102  0010           307        add    r2,#1 shl 4         // wd + 0.25                B6
005C 0702  FFE0           308        and    r2,#%ffff shl 5     // wid = int[2*(wd + 0.25)]/2  B6
0060 0502  0CB0           309        cp     r2,#50 shl 6        // wid invalid ?
0064 E904                 310        if lt then
0066 2102  6A40           311        ld     r2,#425 shl 6       // y. wid = 425 Hz          B6
```

```
page
005A 6F02 9086        312       ld      wr,r2           // wr = 425 Hz        B6
                      313       fi
                      314 //
                      315 //
                      316 //          df = df - (wr - wid)
                      317 //          wr = wid
                      318 //
                      319 //
006E 6105 908A        320       ld      r5,df           // df                 B6
0072 B125             321       add     r5,r2           // df + wid           B6
0074 6D02 9086        322       ex      r2,wr           // wr (---) wid       B6
0078 B325             323       sub     r5,r2           // df - [wr - wid]    B6
007A 6F05 908A        324       ld      df,r5           // save df            B6
                      325 //
                      326 //
                      327 //          kf = kf/2 (limit to 1/64)
                      328 //
                      329 //
007E 6102 9090        330       ld      r2,kf           // set kf
0082 0B02 FFFF        331       cp      r2,#-6          // kf > 1/64 ?
0086 E203             332       if gt then
0088 AE20             333         dec   r2,#1           // y. kf = kf/2
008A 6F02 9090        334         ld    kf,r2           // save kf
                      335       fi
                      336 //
008E 9E08             337       ret
                      338
                      339 //
                      340 //
                      341 //      Absolute Value (rr4 = abs[r5])
                      342 //
                      343 //
0090 B14A             344 ABSVAL: exts  rr4             // extend sign into long word
0092 8D44             345       test    r4              // input < 0 ?
0094 ED05             346       if mi then
0096 8D40             347         com   r4              // y. compute abs[input]
0098 8D50             348         com   r5
009A 1604 0000 0001   349         addl  rr4,#1
                      350       fi
00A0 9E08             351       ret
                      352
00A2                  353       END FREQSEL 355       GLO   LDAMP PROCEDURE
00A2                  356       LB    ENTRY
                      357
                      358 //    ENTRY
                      359 //
                      360 //    Load Counter with Drive Frequency
                      361 //
                      362 //         DIVCNT = 2.4576/4 MHz / wr
                      363 //
00A2 1402 0258 0000   364       ldl   rr2,#2457600/4 shl 6   // 2.4576/4 MHz    B0
00A8 5B02 9086        365       div   rr2,wr                 // 2.4576/4 MHz / wr B0
```

(arrows annotate: left column = MACHINE CODE, middle column = SOURCE CODE)

```
page
00AC 2105 FF0A    366        ld      r5,#%ff0a       // pointer to counter #2 load register
00B0 7D42         367        ldctl   r4,fcw          // flag and control word
00B2 7C01         368        di      vi              // disable vectored interrupt
00B4 3B56 FFD2    369        out     CTRC,r5         // counter #2 load register
00B8 3B36 FFD0    370        out     CTRB,r3         // load counter #2
00BC 7D4A         371        ldctl   fcw,r4          // restore flag and control word
                  372 //
00BE 9E08         373        ret
                  374
00C0              375        END LDCNTR
                  376 //
                  377        GLOBAL
00C0              378        LDAMP PROCEDURE
                  379        ENTRY
                  380 //
                  381 //
                  382 /A*    Load Dither Drive Amplitude D/A's
                  383 //
                  384 //
00C0 6102 9050    385        ld      r2,dr           // dr                            B15
00C4 A123         386        ld      r3,r2           // dr                            B15
00C6 B339 FFFD    387        sra     r3,#3
00CA 0703 000F    388        and     r3,#%000f       // DRSG = 4 ls bits
00CE 8122         389        add     r2,r2           // dr
00D0 A02A         390        ldb     rl2,rh2         // DR = 8 ms bits
00D2 3B36 7B04    391        out     DRSG,r3         // load D/A ls bits
00D6 3B26 7B00    392        out     DR,r2           // load D/A ms bits
                  393 //
00DA 9E08         394        ret
                  395
00DC              396        END LDAMP 398        GLOBAL  DEPTHCTL
00DC              399        /DF  HL PROCEDURE
                  400        yEN
                  401 //     ENTRY
                  402 //     amp = (amp + (isc**2 + iss**2)/amp)/2
                  403 //     da = (ddt - amp)*ka
                  404 //     dai = dai + da*ki
                  405 //     dr = dai + da + (da - daold)*kd; daold = da
                  406 //     ka = 8/500/6/50 B29; ki = 1/4; kd = 1/2
                  407 //
00DC 6107 907E    408        ld      r7,is32         // isc                           B0
00E0 9976         409        mult    rr6,r7          // isc**2                        B0/-16
00E2 6105 9080    410        ld      r5,is32+2       // iss                           B0
00E6 9954         411        mult    rr4,r5          // iss**2                        B0/-16
00E8 9664         412        addl    rr4,rr6         // isc**2 + iss**2               B0/-16
00EA B34D FFFE    413        sral    rr4,#2          // rescale                       B-2/-18
00EE 6102 904A    414        ld      r2,amp          // old amplitude                 B-1
00F2 BDA4         415        ldk     r10,#4          // iteration count
                  416
00F4 9446         417 dc020: ldl     rr6,rr4         // amp**2                        B-2/-18
00F6 9B26         418        div     rr6,r2          // amp**2 / old amp              B-1
00F8 8172         419        add     r2,r7           // old amp + amp**2 / old amp    B-1
00FA 8E22         420        cp      r2,r2           // clear carry flag
00FC B32C         421        rrc     r2,#1           // new amp                       B-1
00FE FAB5         422        djnz    r10,dc020       // done ?
0100 6F02 904A    423        ld      amp,r2          // y. save amp                   B-1
                  424 //
0104 6103 9048    425        ld      r3,ddt          // ddt                           B-1
```

```
page
0108 8323            426        sub    r3,r2          // ddx - abf              # 1
010A 5902 904C       427        mult   rr2,ka         // da = (ddx - abf)*ka    B39/12
010E 9622            428        addl   rr2,rr2        // da                     B29/13
0110 A123            429        ld     r3,r2          // save it                B13
                     430 //
0112 B339 FFFE       431        sra    r3,#2          // da*h:                  B13
0116 6104 9044       432        ld     r4,dai         // dai                    B13
011A 8134            433        add    r4,r3          // dai + da*h             B13
011C 0B04 2000       434        cp     r4,#1 shl 13   // dai > 1 ?
0120 E203            435        if gt then
0122 2104 2000       436           ld  r4,#1 shl 13   // y. dai = 1             B13
0126 E805            437           jr  dc030
                     438        fi
0128 0B04 E000       439        cp     r4,#-1 shl 13  // dai < -1 ?
012C E902            440        if lt then
012E 2104 E000       441           ld  r4,#-1 shl 13  // y. dai = -1            B13
                     442        fi 444 //     d
0132 6F04 9044       445 dc030: ld     dai,r4         // save dai               B13
0136 A123            446        ld     r3,r2          // da                     B13
0138 4303 9042       447        sub    r3,da          // da - old da            B13
013C 6F02 9042       448        ld     da,r2          // old da = new da        B13
0140 B339 FFF1       449        sra    r3,#15         // (da - old da)*d        B13
0144 8132            450        add    r2,r3          // da + (da - old da)*d   B13
0146 8124            451        add    r4,r2          // dr                     B13
0148 E409            452        jr     ov,dc040       // overflow ?
014A 0B04 0333       453        cp     r4,#819        // n. dr < 10% f.s. ?
014E E903            454        if lt then
0150 2104 0CCD       455           ld  r4,#3277       // y. dr = 10% f.s.       B15
0154 E803            456           jr  dc050
                     457        fi
0156 0B04 1CCD       458        cp     r4,#7373       // dr > 90% f.s. ?
015A E203            459        if gt then
015C 2104 7333       460 dc040: ld     r4,#29491      // y. dr = 90% f.s.       B15
0160 EB02            461           jr  dc050
                     462        fi
0162 8144            463        add    r4,r4
0164 8144            464        add    r4,r4          // dr                     B15
                     465
0166 6F04 9050       466 dc050: ld     dr,r4          // save dr                B15
016A 8144            467        add    r4,r4          // dr                     B16
016C A04C            468        ldb    rl4,rh4        // dr                     B8
016E 3B46 7B00       469        out    DR,r4          // output dr to D/A
                     470 //
                     471 //     Add Random Noise to Dither Drive Amplitude
                     472 //
0172 6702 9006       473        bit    bdisab,#2      // secondary dither enabled ?
0176 E605            474        if nz then
0178 6102 9046       475           ld  r2,ddkref      // n. ddkref
017C 6F02 9048       476           lo  ddr,r2         // ddk = ddkref
0180 EB13            477           jr  dc060
                     478        fi
0182 6B00 9056       479        dec    sddue,#1       // secondary dither due ?
0186 EE10            480        jr     nz,dc060       // n.
0188 6102 9054       481        ld     r2,sdrate      // set sec. dither rate divide count
018C 6F02 9056       482        ld     sddue,r2       // y. new due time
0190 61C5 904E       483        ld     r5,rand        // random number seed     B0
0194 1904 2FB7       484        mult   rr4,#12167     // r = seed * 23**3 @ B0  B0
0198 6F05 904E       485        ld     rand,r5        // save seed for next time B0
019C 5904 9058       486        mult   rr4,sdmod      // noise = (r/2**15)*0.4*DDKREF B15/-1
```

```
rase                            21                                                      22
01A0 4104 9046       487       add     r4,ddkref          // ddk = ddkref + noise        B-1
01A4 6F04 9049       488       ld      ddk,r4             // save ddk                    B-1
                     489 //
01A8 9E08            490 dc060: ret
                     491
01AA                 492       END DEPTHCTL
                     494       Z GLOBAL PR
01AA                 495       BDB PROCEDURE
                     496       VER
                     497 //    ENTRY
                     498 //
                     499 //    Body Dither Bessel Zero & Mirror Dither Bessel Zero
                     500 //
                     501 //            dith = dthsi - dthdi
                     502 //            ddith = ddkref - dith
                     503 //
01AA 9244            504       subl    rr4,rr4            // rr4=0
01AC 7C01            505       di      vi                 // disable vectored interrupts
01AE 5402 905E       506       ldl     rr2,dthsi          // dthsi                       pulses B16/0
01B2 5202 9062       507       subl    rr2,dthdi          // dith = dthsi - dthdi        B16/0
01B6 5D04 905E       508       ldl     dthsi,rr4          // dthsi=0
01BA 5D04 9062       509       ldl     dthdi,rr4          // dthdi=0
01BE 7C05            510       ei      vi                 // enable vectored interrupts
01C0 5D02 9066       511       ldl     dith,rr2           // save dith (pulses due to dither)
                     512 //
                     513 //    Body Dither Bessel Zero
                     514 //
                     515 //            dr = dr + ddith*l
                     516 //
01C4 6707 9006       517       bit     bdisab,#7          // body dither bessel zero enabled ?
01C8 EE17            518       if z then
01CA 5404 905A       519         ldl   rr4,bdbref         // reference pulses             B16/0
01CE 9224            520         subl  rr4,rr2            // ddith = reference - dither pulses
01D0 5D04 906A       521         ldl   ddith,rr4          // save it                      B16/0
01D4 B34D 0006       522         slal  rr4,#6             // ddith * k                    B15/-1
01D8 5604 9050       523         addl  rr4,dr             // dr = dr + ddith*k            B15/-1
01DC EC03            524         if ov then               // overflow ?
01DE 1404 7FFF FFFF  525           ldl rr4,#%7fffffff     // y, dr = 100% DAC             B15/-1
                     526         fi
01E4 1004 0CCD 0000  527         cpl   rr4,#3277 shl 16   // dr < 10% DAC ?
01EA E903            528         if lt then
01EC 1404 0CCD 0000  529           ldl rr4,#3277 shl 16   // y, dr = 10% DAC              B15/-1
                     530         fi
01F2 5D04 9050       531         ldl   dr,rr4             // save dr                      B15/-1
01F6 E81F            532         jr    md999
                     533       fi
                     535 //
                     536 //    MIRROR
                     537 //    Dither Bessel Zero
                     538 //
                     539 //            vacp = vacp + ddith * k
                     540 //            vacm = vacp
                     541 //
01F8 6708 9006       542       bit     bdisab,#8          // mirror dither enabled ?
01FC EE1C            543       if z then
01FE 5404 905A       544         ldl   rr4,bdbref         // y, reference pulses          B0/-16
0202 9224            545         subl  rr4,rr2            // ddith = reference - dither pulses
0204 5D04 906A       546         ldl   ddith,rr4          // save it                      B0/-16
```

```
page
0208 B359 FFFC        547          sra     r5,#4            // ddith * k
020C 4105 91C4        548          add     r5,vacp          // + vacp = vacp
0210 E408             549          jr      ov,md010         // overflow ?
0212 0B05 199A        550          cp      r5,#6554         // n. vacp < 20% DAC full scale ?
0216 E902             551          if lt then
0218 2105 199A        552              ld  r5,#6554         // y. vacp = 20% DAC full scale
                      553          fi
021C 0B05 6666        554          cp      r5,#26214        // vacp > 80% DAC full scale ?
0220 E202             555          if gt then
                      556
0222 2105 6666        557 md010:   ld      r5,#26214        // y. vacp = 80% DAC full scale
                      558          fi
0226 7C01             559          di      vi
0228 6F05 91C4        560          ld      vacp,r5          // save vacp
022C 6F05 91C6        561          ld      vaca,r5          // save vaca
0230 7C05             562          ei      vi
0232 5F00 7A00*       563          call    MEITHAC+FL       // load mirror dither DAC's
                      564          fi
                      565
0236 9E08             566 md999:   ret
                      567
0238                  568          END BDBZ
                      569
                      570 END DITHER
         0 errors
         Assembly complete

FIZASM   1.6          ZBS
LOC  OBJ CODE         STMT SOURCE STATEMENT

1 CL_CONTROL MODULE
                      2
                      3 CONSTANT
                      4          SUPPRESS := 1             // do not list database
                      5 //
                      6 //       $title "GEU II, 52 cm Version, Cavity Length Control, 05/02/84"
                      7 //
                      8 //
                      9 //       Global Definitions Database              04/26/84
                     10 //
                     11 //
                     12          $IF SUPPRESS $THEN
                     13          $LISTOFF
                    253          $LISTON
                    254
                    255          $REL    %0000
                    256 //
                    257          GLOBAL
0000                258          CLCNTRL PROCEDURE
                    259          ENTRY
                    260 //
                    261 //       Cavity Length Control
                    262 //
000C 6705 9006      263          bit     bdisab,#6        // mode hop enabled ?
0004 E603           264          if nz then
0006 6305 9006      265              res bdisab,#6        // y. disable mode hop
000A DF6E           266              calr MODEHOP         // perform mode hop
```

```
page
                        267       fi
000C 2106  91AA         268       ld     r6,#clcenab     // cavity length control flag word
0010 2762               269       bit    @r6,#2          // cavity length control complete ?
0012 EE3D               270       jr     z,clcret        // y.
0014 2761               271       bit    @r6,#1          // n. cavity length mode step enabled ?
0016 E60E               272       jr     z,clc005        // n.
0018 2764               273       bit    @r6,#4          // do cavity length mode step ?
001A E60A               274       if nz then
001C DFC7               275         calr CLSTEP          // y. cavity length mode step
001E 2562               276         set  @r6,#2          // disable cavity length mode step
0020 6309  9006         277         res  bdisab,#9       // enable software path length control
0024 6304  9006         278         res  bdisab,#4       // enable auto-null
0028 4D05  9014  1000   279         ld   rep,#2048*2     // new repetition rate
002E E82F               280         jr   clcret
                        281       fi
0030 DFB1               282       calr   CLSWEEP         // n. cavity length mode sweep
0032 E82D               283       jr     clcret 285 //
                        286 //
                        287 //
                        288 //
                        289 //
0034 2760               290 clc005: bit  @r6,#0          // n. desired dither amplitude reached ?
0036 E61B               291       if nz then
0038 6900  91A8         292         inc  clccnt,#1       // y. increment counter
003C 6103  91A8         293         ld   r3,clccnt       // time = count * 32
0040 0B03  0060         294         cp   r3,#32*3        // time > 3 seconds ?
0044 E124               295         jr   lt,clcret       // n.
0046 6102  91D8         296         ld   r2,pca
004A 0B02  099A         297         cp   r2,#2458        // desired plasma intensity ?
004E E202               298         if st then
0050 6504  900A         299           set fail,#4        // n. flag plasma intensity failure
                        300         fi
0054 630C  9020         301         res  dout,#12        // ignition aid off
0058 650D  9020         302         set  dout,#13        // start enable off
005C 6102  9020         303         ld   r2,dout
0060 3B26  7B20         304         out  DOUT,r2
0064 0B03  0080         305         cp   r3,#32*4        // time > 4 seconds ?
0068 E112               306         jr   lt,clcret       // n.
006A 2561               307         set  @r6,#1          // y. enable cavity length control
006C E810               308         jr   clcret
                        309       fi
006E 4D08  9090         310       clr    kf              // kf = 2^0 = 1
0072 6102  904A         311       ld     r2,amp          // dither amplitude         b-1
0076 4B02  9046         312       cp     r2,ddkref       // amplitude > desired amplitude ?
007A E209               313       if st then
007C 2560               314         set  @r6,#0          // y. flag desired amplitude reached
007E 650C  9020         315         set  dout,#12        // ignition aid on
0082 630D  9020         316         res  dout,#13        // start enable on
0086 6102  9020         317         ld   r2,dout
008A 3B26  7B20         318         out  DOUT,r2
                        319       fi
                        320 //
008E 9E08               321 clcret: ret
                        322
0090                    323       END CLCNTRL
```

```
Page
                      325         GLOBAL CLSTEP
009C                  326         CLSTEP  PROCEDURE
                      327                 EN
                      328  //             ENTRY
                      329  //     Cavity Length Mode Step
                      330  //
                      331  //         dstemp = stemp * sf + 248 - To
                      332  //         sf = -162/2048 B17
                      333  //
009C 6103 91E8        334         ld      r3,temp4            // gyro temperature (volts)
0094 1902 D780        335         mult    rr2,#-10368         // stemp scaled deg F         B17/1
0098 B32D 0006        336         slal    rr2,#6              // stemp                      B23/7
009C 0102 5400        337         add     r2,#(248-80) shl 7  // dstemp des F               B7
                      338  //
                      339  //
                      340  //     vcdes = voclc + aclc*dstemp^2 + bclc*dstemp
                      341  //
                      342  //
00A0 A125             343         ld      r5,r2               // dstemp                     B7
00A2 9954             344         mult    rr4,r5              // dstemp^2                   B14/-2
00A4 A123             345         ld      r3,r2               // dstemp                     B7
00A6 5902 91D2        346         mult    rr2,bclc            // bclc * dstemp = B  volts   B23/7
00AA A145             347         ld      r5,r4               // dstemp^2                   B-2
00AC 5904 91D0        348         mult    rr4,aclc            // aclc * dstemp^2 = A        B33/17
00B0 B34D FFF7        349         sral    rr4,#9              // rescale                    B24/8
00B4 9642             350         addl    rr2,rr4             // A + B               volts  B23/7
00B6 4102 91CE        351         add     r2,voclc            // voclc + (A + B)/2^8 volts  B7
00BA B329 FFFC        352         sra     r2,#4               // rescale             volts  B3
00BE A123             353         ld      r3,r2
00C0 B12A             354         exts    rr2                 //                     volts  B3/-13
00C2 1902 3F03        355         mult    rr2,#16131          // * 128/65 @B13              B16/0
00C6 0102 0080        356         add     r2,#%80             // + DAC bias = vcdes
00CA 6F02 91CC        357         ld      vcdes,r2            // save it
                      358  //
00CE 9E08             359         ret
                      360
00D0                  361         END CLSTEP
                      363         GLOBAL
00D0                  364         CLSWEEP PROCEDURE
                      365                 EN
                      366  //             ENTRY
                      367  //
                      368  //     Cavity Length Mode Sweep
                      369  //
                      370  //
00D0 2106 91AA        371         ld      r6,#clcenab         // cavity length control flag word
00D4 2763             372         bit     @r6,#3              // cavity sweep 1st time through ?
00D6 EE06             373         if z then
00D8 2563             374         set     @r6,#3              // y. flag for next time through
00DA 4D05 91BC 0FF0   375         ld      vcd,#%0FF0          // vcd = + full scale
00E0 DFD9             376         calr    MODEHOF
00E2 E825             377         jr      swret
                      378         fi
00E4 6107 91F2        379         ld      r7,clcliptr         // clc laser intensity buffer pointer
00E8 6102 91BC        380         ld      r2,vcd              // vcd
```

```
00EC 6103  91D4        381       ld    r3,lic              // laser intensity (conditioned)
00F0 6F73  91F4        382       ld    !int(r7),r3         // save in laser intensity buffer
00F4 2765              383       bit   @r6,#5              // sweep direction changed ?
00F6 EE06              384       if z then
00F8 A971              385          inc    r7,#2           // n. increment buffer pointer
00FA BD24              386          test   r2              // 1st sweep complete ?
00FC EE04              387          if z then
00FE 2565              388             set    @r6,#5       // y. change direction of sweep
0100 2107  03FE        389             ld     r7,#sizeof lint*2-2 // point to end of second buffer
0104 E801              390          else
0106 A52F              391             dec    r2,#16       // sweep clc voltage
                       392          fi
0108 6F07  91F2        393          ld     clcIptr,r7      // save buffer pointer
010C E80D              394          jr     clc030
                       395       fi
010E AB71              396       dec   r7,#2               // decrement buffer pointer
0110 6F07  91F2        397       ld    clcIptr,r7          // save pointer
0114 A92F              398       inc   r2,#16              // sweep clc volts in opposite direction
0116 0B02  0FF0        399       cp    r2,#%0ff0           // sweep complete ?
011A E206              400       if st then
011C 2564              401          set   @r6,#4           // y. flag clc mode step search
011E 4D05 91BC 0800    402          ld    vcd,#%0800       // vc desired = 0 volts
0124 DFFB              403          calr  MODEHOP
0126 EB03              404          jr    swret
                       405       fi
                       406 //
0128 6F02  91BC        407 clc030: ld   vcd,r2             // save vcd
012C DFFF              408       calr   MODEHOP
                       409 //
012E 9E08              410 swret: ret
                       411
0130                   412       END CLSWEEP
                       414       GLOBAL MODEHOP
0130                   415       MODEHOP PROCEDURE
                       416       ENTRY
                       417 //
                       418 // Mode Hop
                       419 //
0130 6102  91BC        420       ld    r2,vcd              // clc desired output voltage
0134 6F02  91BE        421       ld    vcout,r2            // vcout = desired output voltage
0138 4D05 91AE 1000    422       ld    mbias,#4096         // initialize mirror bias
013E 6103  91AE        423       ld    r3,mbias            // mirror bias
0142 8323              424       sub   r3,r2               // - vcout = vclcm
0144 0B03  0FFF        425       cp    r3,#4095            // vclcm ) full scale ?
0148 E202              426       if st then
014A 2103  0FFF        427          ld    r3,#4095         // y. vclcm = full scale
                       428       fi
014E 670A  9006        429       bit   bdisab,#10          // clc positive mirror enabled ?
0152 E602              430       if nz then
0154 2102  0800        431          ld    r2,#%0800        // n. vclcp = 0 volts
                       432       fi
0158 670B  9006        433       bit   bdisab,#11          // clc negative mirror enabled ?
015C E602              434       if nz then
015E 2103  0800        435          ld    r3,#%0800        // n. vclcm = 0 volts
                       436       fi
                       437 //
```

```
0162 A124           438       ld      r4,r2               // vclcp
0164 A0B4           439       ldb     rh4,r13             // vclca shi 8 : vclcp
0166 3B46 7B08      440       out     DACLS,r4            // write to DAC res bits 0-3
016A B346           441       rr      r4,#2
016C B346           442       rr      r4,#2
016E 3B46 7B0A      443       out     DACMD,r4            // write to DAC res bits 4-7
0172 A02B           444       ldb     r13,rh2
0174 3B36 7B0C      445       out     DACMS,r3            // write to DAC res bits 8-11
0178 3B36 7B0E      446       out     DACCMD,r3           // transfer resisters to DAC
                    447 //
017C 4D05 91B0 00C4 448       ld      plccnt,#4           // initialize counter
0182 4D08 91B2      449       clr     lis                 // clear laser intensity sum
0186 4D08 91B6      450       clr     vci                 // clear clc voltage integrator
                    451 //
018A 9E08           452       ret
                    453
018C                454       END MODEHOP 456       GLOBAL MDITHER
018C                457       MD    PROCEDURE
                    458       V
                    459 //    ENTRY
                    460 //    Mirror Dither
                    461 //
018E 6705 9006      462       bit     bdisab,#5           // mirror dither enabled ?
0190 EE31           463       if z then
0192 6B09 91C0      464          dec  mdcnt,#1            // y. mirror dither due ?
0196 EE2E           465          if z then
0198 6509 91C0      466             set  mdcnt,#0         // y. new due time
019C 6102 91BE      467             ld   r2,vcout         // get vcout
01A0 6103 91AE      468             ld   r3,mbias         // clc mirror bias
01A4 8323           469             sub  r3,r2            // - vcout = vclca
01A6 0B03 0FFF      470             cp   r3,#4095         // vclca ) full scale ?
01AA E202           471             if st then
01AC 2103 0FFF      472                ld    r3,#4095     // y. vclca = full scale
                    473             fi
01B0 6104 91C2      474             ld    r4,vdm          // vdm (mirror dither modulation)
01B4 8D42           475             neg   r4              // vdm = -vdm
01B6 6F04 91C2      476             ld    vdm,r4          // save new vdm
                    477 //
01BA 8142           478             add   r2,r4           // vclcp = vcout + vdm
01BC EDC1           479             if mi then
01BE 8322           480                sub   r2,r2        // y. vclcp = 0
                    481             fi
01C0 0B02 0FFF      482             cp    r2,#4095        // vclcp ) full scale ?
01C4 E202           483             if st then
01C6 2102 0FFF      484                ld    r2,#4095     // y. vclcp = full scale
                    485             fi
                    486 //
01CA 8143           487             add   r3,r4           // vclca = vclca + vdm
01CC ED01           488             if mi then
01CE 8333           489                sub   r3,r3        // y. vclca = 0
                    490             fi
01D0 0B03 0FFF      491             cp    r3,#4095        // vclca ) full scale ?
01D4 E202           492             if st then
01D6 2103 0FFF      493                ld    r3,#4095     // y. vclca = full scale
                    494             fi
```

```
page
01DA A124           495         ld      r4,r2           // vclcp
01DC A0B4           496         ldb     rh4,r13         // vclcm shl 8 : vclcp
01DE 3B46  7B0B     497         out     DACLS,r4        // write to DAC res bits 0-3
01E2 B346           498         rr      r4,#2
01E4 B346           499         rr      r4,#2
01E6 3B46  7B0A     500         out     DACMD,r4        // write to DAC res bits 4-7
01EA AC2B           501         ldb     r13,rh2
01EC 3B36  7B0C     502         out     DACMS,r3        // write to DAC res bits 8-11
01F0 3B36  7B0E     503         out     DACCMD,r3       // transfer resisters to DAC
                    504         fi
                    505         fi
01F4 9E08           506         ret
                    507
01F6                508         END MDITHEP
                    510         GLOBAL MDITHAC
01F6                511         MDITHAC PROCEDURE
                    512         ENTRY
                    513 //      ENTRY
                    514 //      Load CLC Mirror Dither DAC's
                    515 //
01F6 6102  91C4     516         ld      r2,vacp         // vac : plus mirror
01FA B329  FFFD     517         sra     r2,#3
01FE 6103  91C6     518         ld      r3,vacm         // vac : minus mirror
0202 B339  FFFD     519         sra     r3,#3
0206 A124           520         ld      r4,r2           // vacp
0208 A0B4           521         ldb     rh4,r13         // vacm shl 8 : vacp
020A 3B46  7B28     522         out     VACLS,r4        // write to DAC res bits 0-3
020E B346           523         rr      r4,#2
0210 B346           524         rr      r4,#2
0212 3B46  7B2A     525         out     VACMD,r4        // write to DAC res bits 4-7
0216 A02B           526         ldb     r13,rh2
0218 3B36  7B2C     527         out     VACMS,r3        // write to DAC res bits 8-11
021C 3B36  7B2E     528         out     VACCMD,r3       // transfer resisters to DAC
0220 9E08           529         ret
                    530
0222                531         END MDITHAC
                    532
                    533 END CL_CONTROL
    0 errors
    Assembly complete
```

What is claimed is:

1. A method of controlling a ring laser gyro having a cavity with at least one control transducer associated with a reflective surface thereof and at least one parameter characteristic of cavity operation, comprising the steps of:

maintaining a preselected model of cavity operation;
   sampling cavity data as a measure of said parameter;
   comparing the data to the model; and
   controlling the transducer so that the parameter conforms to the model.

2. The method of claim 1 wherein:
   the model is maintained by storing digital information representative of it;
   the sampled data is digitized; and
   the data is compared to the model using digital techniques.

3. The method of claim 1 for use in controlling a gyro having at least two transducers associated with different reflective surfaces of the cavity to control path length, wherein:
   said reflective surfaces are dithered;
   said parameter characteristic of cavity operation is the amplitude of dither;
   the model defines an optimal amplitude of said dither; and
   the transducers are controlled to dither the reflective surfaces at the optimal amplitude.

4. The method of claim 3 wherein:
   the optimal amplitude is an amplitude at which theoretical bias error of the gyro due to lock-in is substantially zero.

5. The method of claim 4 wherein:
   the optimal amplitude is no more than approximately ten (10) degrees per second.

6. The method of claim 5 wherein:
the optimal amplitude is at least one-tenth (0.1) degree per second.

7. The method of claim 4 wherein:
the reflective surface is dithered by applying to the transducer an alternating voltage having an amplitude of at least ten volts.

8. The method of claim 4 wherein:
the reflective surface is dithered at a frequency of approximately 2000 hertz.

9. The method of claim 4 wherein:
the reflective surfaces are dithered simultaneously in such a manner that path length remains constant.

10. The method of claim 4 wherein the amplitude of dither is sampled and controlled by:
isolating a dither component of the gyro output signal;
summing the dither component over a preselected period of time;
comparing the total dither component to a reference value derived from the cavity model to generate an error signal; and
applying the error signal to the reflective surface.

11. The method of claim 4 wherein:
the model comprises a range of dither amplitude containing a plurality of values at which theoretical bias error due to lock-in is substantially zero;
the transducers are dynamically controlled over the range to operate the gyro at said plurality of amplitude values; and
the random walk of the gyro is measured at each of said amplitude values as a measure of mirror quality.

12. The method of claim 11 wherein:
said plurality of amplitude values are ranked according to random walk of the gyro at each value; and
the value at which the lowest random walk occurs is selected as said optimal amplitude.

13. The method of claim 1 wherein:
the sampled data is a measure of the intensity of the laser beam within the cavity; and
the model represents a cavity operated at a preselected variable intensity level.

14. The method of claim 13 wherein:
the model defines an optimal intensity within at least one preselected mode of the cavity;
said optimal intensity is displaced from the peak of laser intensity within the mode; and
the transducer is controlled to operate the cavity at said optimal intensity.

15. The method of claim 13 wherein:
the model defines a plurality of operating modes of the cavity and contains information as to the relative performance of the gyro in each of said operating modes as a function of at least one environmental condition;
a value corresponding to the environmental condition is sensed;
a mode giving rise to optimal performance under the sensed value is selected; and
the transducer is driven so that the cavity acquires and maintains the selected mode.

16. The method of claim 15 wherein:
the environmental condition is temperature; and
the transducer is driven by applying a voltage signal corresponding to the selected mode.

17. The method of claim 16 which further comprises the steps of:
sensing changes in the value of the environmental condition as the gyro operates;
selecting, in response to a preselected change in said value, a different mode giving rise to optimal performance; and
driving the transducer so that the cavity acquires and maintains said different mode.

18. A method of controlling a ring laser gyro having a cavity with at least two control transducers associated with reflective surfaces thereof, comprising the steps of:
maintaining a preselected model of cavity operation in which the reflective surfaces are dithered;
dithering the reflective surfaces of the cavity;
sampling data as a measure of the amplitude of said dither; and
controlling the transducers so that the amplitude of said dither conforms to the model.

19. The method of claim 18 wherein:
the model defines an optimal amplitude of said dither at which bias error due to lock-in is substantially zero; and
the transducers are controlled so that the reflective surface is dithered at said optimal amplitude.

20. A method of controlling a ring laser gyro having a cavity with at least one control transducer associated with a reflective surface thereof, comprising the steps of:
maintaining a preselected model of cavity operation which includes an optimal laser intensity within at least one preselected mode of the cavity, said optimal intensity being displaced from the peak of laser intensity within the mode;
sampling cavity data as a measure of laser intensity; and
controlling the transducer to operate the cavity at said optimal intensity.

21. A method of controlling a ring laser gyro having a cavity with at least one control transducer associated with a reflective surface thereof, comprising the steps of:
maintaining a preselected model of cavity operation which includes information as to the relative performance of the gyro in different operating modes of the cavity, as a function of at least one environmental condition;
sensing a value corresponding to the environmental condition;
selecting an operating mode giving rise to optimal performance under the sensed value; and
driving the transducer so that the cavity acquires the selected operating mode.

22. The method of claim 21 wherein:
said environmental condition is temperature.

23. The method of claim 21 which further comprises the steps of:
sensing changes in the value of said environmental condition as the gyro operates;
selecting, in response to a preselected change in said value, a different mode giving rise to optimal performance; and
driving the transducer so that the cavity acquires said different mode.

24. In a ring laser gyro having a cavity with at least one control transducer associated with a reflective surface thereof and at least one parameter characteristic of cavity operation, a control system comprising:
means for maintaining a preselected model of cavity operation;

means for sampling cavity data as a measure of said parameter;

means for comparing the data to the model; and means for controlling the transducer so that the parameter conforms to the model.

25. The gyro of claim 24 wherein:

the means for maintaining the model comprises means for storing digital information representative of the model; and the sampling means includes means for digitizing the sampled data.

26. The gyro of claim 24 wherein:

the gyro has at least two control transducers associated with different reflective surfaces of the cavity for controlling the path length of the cavity; and the controlling means comprises means for dithering said reflective surfaces at an optimal amplitude defined by the model.

27. The gyro of claim 26 wherein:

said optimal amplitude is an amplitude at which theoretical bias error due to lock-in is substantially zero.

28. The gyro of claim 27 in which:

the means for controlling the transducers is constructed and arranged to dither the reflective surfaces simultaneously while maintaining path length constant.

29. The gyro of claim 27 wherein:

the sampling means comprises means for isolating a dither component of the gyro output signal; and the comparing means comprises means for summing said dither component over a preselected period of time and comparing the sum to a reference value derived from the cavity model to generate an error signal; and the means for controlling the transducers comprises means for applying the error signal to the transducers.

30. The gyro of claim 27 wherein:

the model comprises a range of dither amplitude containing a plurality of values at which theoretical bias error due to lock-in is substantially zero;

the means for controlling the transducers comprises means for controlling the transducers to operate the gyro sequentially at each of said plurality of amplitude values; and the gyro further comprises means for measuring the random walk of the gyro at each of said amplitude values as a measure of mirror quality.

31. In a ring laser gyro having a cavity with at least one control transducer associated with a reflective surface thereof, a control system comprising;

means for storing information as to an optimal laser intensity within at least one preselected mode of the cavity, said optimal intensity being displaced from the maximum laser intensity within the mode;

means for sampling cavity data as a measure of laser intensity;

means for digitizing the sampled data; and means for controlling the transducer in accordance with the digitized data and the stored information to operate the cavity at said optimal intensity.

32. In a ring laser gyro having a cavity with at least one control transducer associated with a reflective surface thereof, a control system comprising:

means for storing information as to the relative performance of the gyro in different operating modes of the cavity, as a function of at least one environmental condition;

means for sensing a value corresponding to said condition;

means for selecting an operating mode giving rise to optimal performance under the sensed value; and means for driving the transducer so that the cavity acquires and maintains the selected operating mode.

33. The gyro of claim 32 wherein:

the environmental condition is temperature.

* * * * *